No. 655,773. Patented Aug. 14, 1900.
W. M. FRANK.
CORN PLANTER.
(Application filed Aug. 5, 1898.)
(No Model.) 3 Sheets—Sheet 1.
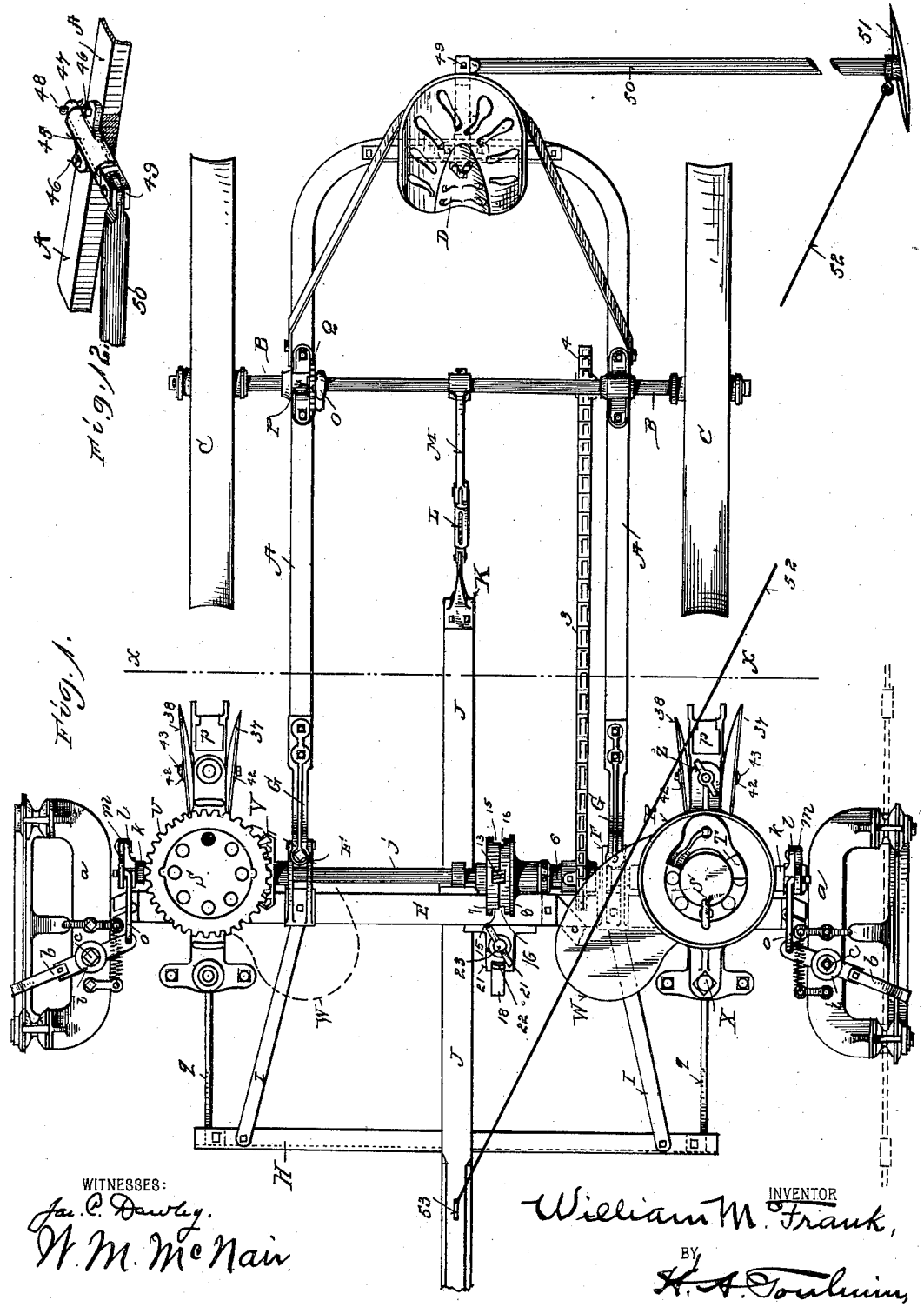
WITNESSES:
INVENTOR
William M. Frank,
BY
ATTORNEY.

No. 655,773. Patented Aug. 14, 1900.
W. M. FRANK.
CORN PLANTER.
(Application filed Aug. 5, 1898.)
(No Model.) 3 Sheets—Sheet 2.
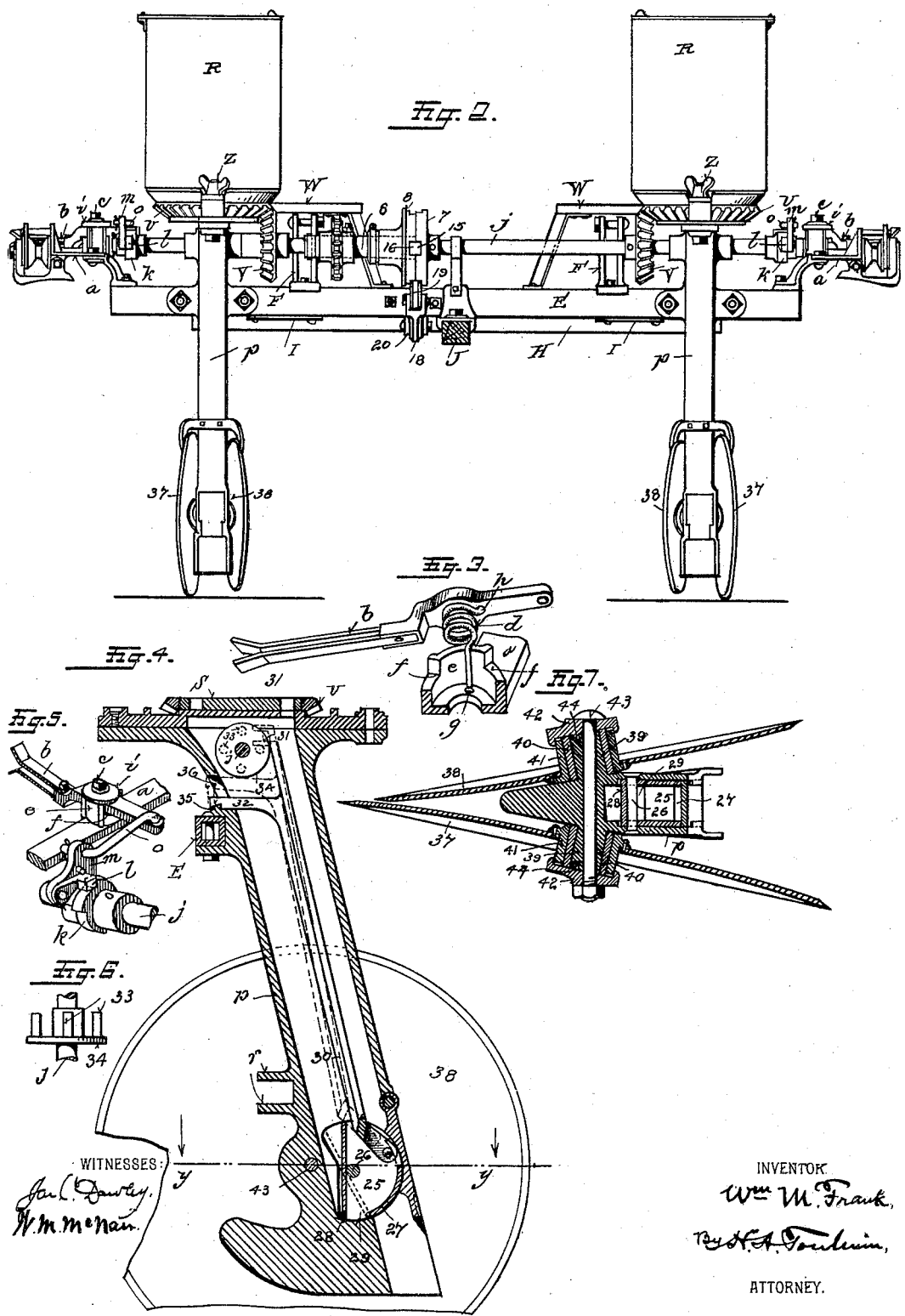
WITNESSES:
INVENTOR
ATTORNEY.

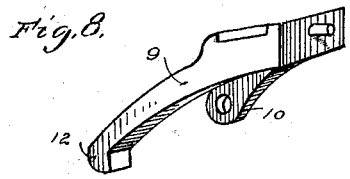
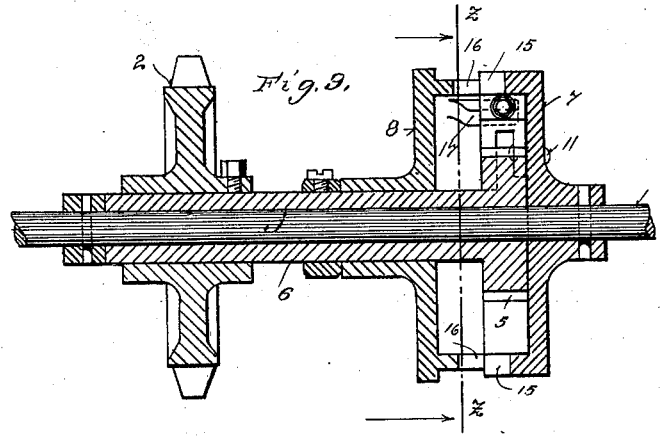
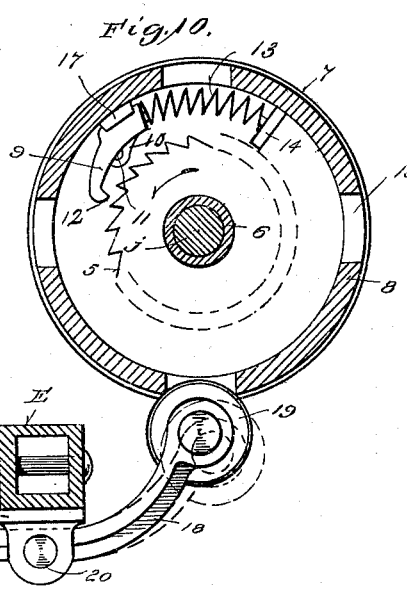
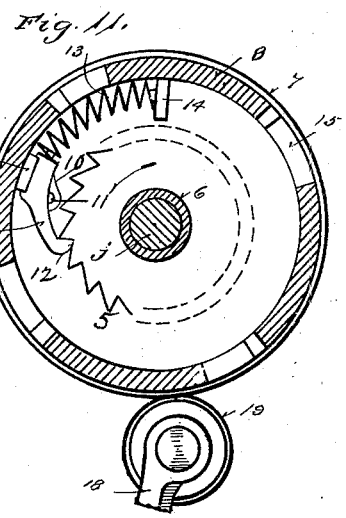

UNITED STATES PATENT OFFICE.

WILLIAM M. FRANK, OF SPRINGFIELD, OHIO, ASSIGNOR TO THE A. C. EVANS MANUFACTURING COMPANY, OF SAME PLACE.

CORN-PLANTER.

SPECIFICATION forming part of Letters Patent No. 655,773, dated August 14, 1900.

Application filed August 5, 1898. Serial No. 687,794. (No model.)

*To all whom it may concern:*

Be it known that I, WILLIAM M. FRANK, a citizen of the United States, residing at Springfield, in the county of Clark and State of Ohio, have invented certain new and useful Improvements in Corn-Planters, of which the following is a specification, reference being had therein to the accompanying drawings.

This invention relates to certain new and useful improvements in corn-planters adapted to be adjusted so as to plant corn in hills or to plant it by drilling.

The several features of my invention are as follows: (*a*) the construction of the bearing for furrow-opening disks, so as to form a movable and renewable wearing-surface; (*b*) a new arrangement of the spring for returning the check-row lever or arm to normal position after passing out of engagement with the knot in the check-row wire; (*c*) a new arrangement for operating the valve in the seed-tube by means of a disk on the dropper-shaft adapted to open the valve by a positive pull and allow the valve to close by the gravity of the valve-rod, such being the construction of this valve and valve-rod with relation to the tube that when the corn is drilled instead of planted in hills the valve-rod can be secured to hold the valve in open position without interfering with the dropping devices; (*d*) a new type of clutch for intermittently transmitting to the dropper-shaft a continuous rotary motion received from the ground-wheels; (*e*) an arrangement for adjusting the clutch so that it will thus perform or will continuously transmit to the dropping devices the continuous rotary motion from the ground-wheels, so as to plant the seed in drilled furrows or "drills," as it is commonly termed, and to various other features of detail.

In the accompanying drawings, forming a part of this specification, and on which like reference characters indicate corresponding parts, Figure 1 is a plan view of a select type of corn-planter with my improvements embodied therein; Fig. 2, a rear elevation of the front part of the machine looking forward from the line *x x* of Fig. 1; Fig. 3, a detail perspective view of the check-row lever and its spring and support; Fig. 4, a vertical sectional view of the seed-tube, dropping-plates, and discharging-valve, with one of the disks in side elevation and partly broken away; Fig. 5, a detail perspective view of part of the check-row attachment, showing how the same is connected with the dropper-shaft; Fig. 6, a detail plan view of the disk for operating the discharge-valve in the seed-tube; Fig. 7, a detail view, in horizontal section on the line *y y* of Fig. 4, of the disks and seed-tube, showing the construction of the bearing; Fig. 8, a detail perspective view of the detent forming a part of the clutch; Fig. 9, a vertical sectional view of the clutch and driving sprocket-wheel shown on the dropper-shaft; Fig. 10, a vertical sectional view, on the line *z z* of Fig. 9, of the clutch, showing the trip-arm of the clutch in elevation and the detent disengaged; Fig. 11, another sectional view of the clutch on the same line *z z* of Fig. 9, showing the detent engaged with the ratchet instead of disengaged, as in Fig. 10; and Fig. 12, a detail perspective view showing the manner in which the liner or marker is connected to the frame of the machine.

The type of corn-planter herein shown, aside from my improvements, is that manufactured by my assignee, the A. C. Evans Manufacturing Company, of Springfield, Ohio.

It consists generally of a rear frame A, mounted upon an axle B, carried by ground-wheels C and supporting a seat D, and of a forward frame composed, essentially, of a cross-beam E, having brackets F, to which are pivotally connected the brackets G of the rear frame, and having also a forward cross-bar H and braces I. Upon this forward frame are mounted various devices that enter into the make-up of the seeding mechanism. A draft-pole J is connected to the beam E and bar H of this forward frame, and thence extends rearwardly and is connected to the axle B through a bracket K, a spring-rod L, and an arm M, secured to the axle, the pole being adjusted up and down through these connections by means of a lever O, secured to the axle B and having a detent P, adapted to lock into the toothed segment Q.

The several devices so far described and other incidental details form no part of my invention, but merely constitute one type of machine upon which my improvements may be used. In this general machine are also included suitable grain-hoppers R, with their dropping-plates S, cut-offs or guards T, dropper-plate gear U, driving-gears V, and hopper-stools W, upon which the hoppers rest when swung to one side on their pivot-bolts X when released by their thumb-screws Z.

I will now refer to the mechanism which enters into my invention.

On the outer ends of the bar A is mounted any suitable type of check-row attachment $a$, the only novel feature of which, so far as concerns this present invention, being more clearly shown in Figs. 3 and 5, in which the check-row lever or fork-arm $b$ is shown to be pivoted upon a bolt $c$ and to be provided with a helical spring $d$, which fits within a cup $e$ cast with or formed on the frame of the check-row attachment and slotted at $f$ to permit the lever to vibrate. This helical spring has one end inserted in a hole through the check-row frame, as shown at $g$, and the other end similarly attached to the lever, as shown at $h$. (See Fig. 3.) The recoil of this spring throws the lever back to its normal position after it is actuated by a knot on the check-row wire and is arrested and held in such normal position by coming in contact with the side wall of the slot $f$. A cap $i$ closes the cup $e$ and is held by the pivot-bolt $c$, so that the spring is entirely inclosed to the exclusion of dust, grit, and rain. The construction is effective and simple for the purpose indicated.

From Figs. 1, 2, and 5 it will be seen that the check-row lever at each side of the machine is connected with the dropper-shaft $j$ in a manner to intermittently rotate it when these levers are respectively engaged by the knot on the check-row wire. This connection consists of ratchet-wheels $k$, secured to the dropper-shaft, and a detent $l$, adapted to engage with these ratchets, respectively, and respectively carried by arms $m$, mounted upon the dropper-shaft and connected by pitmen $o$ with the levers $b$. The springs $d$ in returning the levers to their normal position slide the detents $l$ backward into engagement with other teeth of the ratchet-wheels, so as to give the dropper-shaft another partial rotation when another knot engages the check-row levers, respectively.

The next feature of my invention to which I will refer is the clutch on the dropper-shaft for intermittently transmitting to the dropper-shaft the continuous rotary motion derived from the ground-wheels when set with its parts in one relation and for continuously transmitting to the dropper-shaft the continuous rotary motion derived from the ground-wheels when the parts of the clutch are set in another position, so that in the former instance hill-planting can be performed and in the latter drill-planting may be effected. Thus the requisite motion, intermittent in one case and continuous in the other, is transmitted to the dropper-plates, such motions passing from the dropper-shaft through the bevel-gears V and U to the dropper-plates S and thence into the seed-tubes $p$, secured to the cross-beam E and braced to the forward bar H by braces $q$, secured to said bar and to lugs $r$ on the seed-tubes.

The valve mechanism in the seed-tubes $p$ I will refer to hereinafter.

Returning again to the clutch *per se*, attention is directed particularly to Figs. 9, 10, and 11. A sprocket-wheel 2 receives motion through a sprocket-chain 3 from a sprocket-wheel 4 on the main axle B and conveys this motion to a ratchet-wheel 5, fixed to the sleeve 6, loosely mounted upon the dropper-shaft. This ratchet-wheel is housed by two shells or cups 7 and 8. The shell 7 is rigidly secured to the dropper-shaft $j$, while the shell 8 is loosely mounted upon the sleeve 6 of the ratchet-wheel 5. A detent 9 is employed to connect the shell 7 with the ratchet-wheel 5 intermittently, and the shell 8 is employed, aside from its housing function, to effect the intermittent connection or engagement of the detent with the ratchet-wheel through the action of a trip device. This detent is shown at 9 and is composed of a lug 10, which is pivoted to the cup 7 by the pivot 11, and of a finger 12, with a hooked end adapted to take into the teeth of the ratchet 5. A spring 13 presses against a lug 14 on the shell 7 and against the detent to one side of its pivot, and thus makes the detent 9 to normally engage with the ratchet-wheel 5. (See Fig. 11.) In the two shells there are respectively openings 15 and 16, which when the detent is in engagement with the ratchet, under the influence of the spring 13, as shown in Fig. 11, are out of line or overlapped. As long as they are in that relation the engagement between the pawl and ratchet remains, and so the motion coming from the sprocket-wheel 2 passes from the ratchet-wheel into the detent and thence to the shell 7 and then to the seed-dropper plate. When, however, as these parts rotate, the openings 15 and 16 reach the trip device it springs into them and brings them into line by forcing the loose shell 8 in what may be termed a "backward" direction. This causes the lug 17 on the interior of the shell 8 to tip the detent out of engagement with the ratchet-wheel and to slightly compress the spring 13. The instant the detent leaves the ratchet the rotary motion of the dropper-shaft ceases and the dropping devices stop; but the momentum of the devices is sufficient to carry the shell 7 on past the trip device, which rolls out of the openings and again upon the periphery of the shell 7, which being larger than the diameter of the shell 8 keeps the trip device free of the shell 8 and allows it to again shift forward by the pressure of the spring 13 forcing the detent against its lug 17, and thereby again overlapping the openings 15 and 16. When the next set of these openings reaches the trip device, a like operation takes place, and so on. Thus the rotation of the dropper-shaft is interrupted and the operation of the dropping devices as a consequence becomes intermittent, so that the grain-tube is properly fed for the intermittent discharge permitted by the valve therein. This trip device consists of a lever 18, carrying a roller 19, which works into and out of the openings 15 and 16 and rolls on the periphery of the shell 7, as above described. The lever 18 is pivoted in a clip 20, secured to the cross-beam E of the frame and extends back between two lugs 21 of this clip and is held down at that end by a spring 22, contained in the clip and pressed upon by the thumb-screw 23. The parts are thus arranged when planting in hills. When drilling, the pin 24 is inserted in the lugs 21 and under the trip-lever, the latter being shown in such position, by dotted lines in Fig. 10, so that the roller 19 is brought below the shells 7 and 8, which are allowed to rotate continuously, whereby the grain is continuously dropped or fed for drilling purposes. Thus a mere change of the position of the trip device converts the machine into a corn-planter or a corn-drill, so that it will plant the seed in hills or drill the seed in rows.

I will now refer to the valve in the seed-tube, which during hill-planting is intermittently opened and closed and during drill-planting is held open. This valve consists of a semicircular cut-off 25, seated in the seed-tube $p$ and mounted on a pivot 26 and arranged so that when in one position—that shown in full lines in Fig. 4—its wall 27 will cut off the dropping of the grain and when moving to its open position its wall 28 will dislodge the grain from the shelf 29 in the tube and allow it to drop into the furrow. A valve-stem 30 is pivoted to this valve proper and extends up through the tube, where it has two lateral projections 31 and 32, respectively. The projection 31 is lifted by the successive pins 33 on the plate 34, secured upon the dropper-shaft $j$, so as to open the valve. As these pins successively pass beyond and from under the projection 31 the valve-stem drops down or gravitates and closes the valve. This operation and motion is obtained through the check-row attachment. When drilling is to be done, the projection 32 of the valve-stem is supported in the dotted position shown in Fig. 4 by a suitable plug or device 35, shown in dotted lines as inserted in the slot 36. This holds the valve open, and when this is the case the trip is adjusted as shown in dotted lines in Fig. 10.

I will now refer to my improved furrow-opening devices. These consist of a pair of convergingly-set disks preferably concavo-convex and also preferably of different diameters, although not necessarily other than equal in that respect. By making them of different diameters the larger one more readily effects the initial opening of the soil in making the furrow. These disks are marked 37 and 38, respectively, and are both mounted upon stud-shafts 39, projecting from the seed-tube and preferably cast therewith. These stud-shafts stand at the proper angle to the line of draft to give the disks the desired convergence from their forward edges rearwardly, so as to properly separate the soil to form a furrow and to let the seed-tube come down between the disks, so as to drop the grain in the furrow, which is afterward covered by the action of the large ground-wheels C. To provide bearings which can be renewed from time to time, I place removable sleeves 40 upon the stud-shafts 39 and mount the hubs 41 of the disks upon these sleeves, which when they are worn are removable for the insertion of new ones without supplying any other new parts. As the sleeves are mere short tubes, they are very cheap, so that a good snug bearing is maintained at small cost notwithstanding the comparative rapid wear due to the presence of dust working more or less into the bearing. The sleeves are slightly longer than the hubs, and hence are pressed upon by the caps 42 and kept from rotating in the trunnion, so as to bring all the wear between the sleeves and hubs. The caps are held by a through-bolt 43 and have pins 44, which enter recesses in the ends of the stud-shafts to keep the caps from tending to revolve, so as to more certainly hold the sleeves from rotating.

Thus it will be seen that my improvements constitute simple and effective mechanism for the various parts indicated of a corn-planter and that by a mere adjustment of the clutch-trip and the valve-stem the machine may be converted from a hill-planter to a drill-planter.

I will now refer to the device for producing a line across the field which will serve as a guide for the return trip of the machine after it has once made its initial trip across the field. To the rear end of the frame A, I attach a suitable bearing 45 by means of bolts 46. In this bearing I swivel a stud 47 and hold the same within the bearing by means of a cotter-pin 48. The outer end of this stud is bifurcated, as shown at 49, and has pivoted therein a rod 50. On the outer end of this rod is secured a disk 51, which is slightly inclined to the line of travel. In order to hold this rod 50 at right angles to the line of motion, I provide a rope or chain 52, which is adapted to be secured to the pole J, as shown at 53. In going across the field this liner or marker, by means of its disk, makes a small furrow, and when the machine has crossed the field it is turned around and the pole J is made to come over this furrow or line. The furrower is then swung to the opposite side of the machine, which can readily be done, since it is swiveled to the frame structure of the machine, when it is in position to form a second furrow or line across the field, and so on until the field is completely planted. As the machine moves along across the field the driver constantly keeps the pole J directly above the line or furrow and by that means is enabled to plant the corn in straight rows.

Having thus fully described my invention, what I claim as new, and desire to secure by Letters Patent, is—

1. In a corn-planter, a check-row attachment having a cup, a lever pivoted within the cup, and a spring inclosed by the cup and connected at one end to the lever and at the other to the cup structure.

2. In a corn-planter, a check-row attachment having a cup provided with slots, a lever fitting within said slots, a pivot-bolt passing down through the cup, a cap held by the bolt and acting to hold the lever down within the slots, and a spring within the cup around the pivot-bolt and under the cap and secured at one end of the cap structure and at the other end to the lever.

3. In a corn-planter, the combination with the shaft and the seeding devices operated thereby, of a clutch composed of a ratchet-wheel adapted to receive rotary motion from the ground-wheels, two shells inclosing said ratchet-wheels, a detent carried by one shell and acting normally to engage with said ratchet-wheel and adapted to be thrown out of said engagement by the other shell, and a trip device operating in conjunction with said shells to effect the disengagement of the detent and ratchet.

4. In a corn-planter, the combination with the dropper-shaft and the seed devices operated thereby, of a clutch composed of a ratchet-wheel secured upon the dropper-shaft and adapted to receive motion from the ground-wheel, two shells housing said ratchet-wheel, one connected with the dropper-shaft and the other disconnected therewith, a detent carried by the connected shell and engaged by the disconnected shell, a spring to normally engage the detent and ratchet surface formations on the shells standing out of line when the detent is in engagement and in line when it is out of engagement, and a trip device acting in conjunction with said formations to throw them into line and to permit them to move out of line.

5. In a corn-planter, the combination with the dropper-shaft and its trip device, of a clutch composed of a ratchet having a sleeve secured to the dropper-shaft, a sprocket-wheel secured to the sleeve and adapted to receive motion from the ground-wheel, a shell fixed to the dropper-shaft and inclosing the ratchet, a spring-controlled detent mounted in said shell and adapted to coact with the ratchet-wheel, and another shell loosely mounted on the sleeve and having a lug engaging with the detent, and both shells provided with openings, one shell being slightly larger than the other, and a trip device composed of a spring-held lever having a roller adapted to travel on the larger shell and to work into said openings and cause them to match in position, for the purposes set forth.

6. In a corn-planter, a clutch composed of a rotatable ratchet-wheel and a rotatable shell secured upon the same shaft, a detent to alternately connect and disconnect said shells and ratchet-wheel, a spring to effect the normal engagement, and another shell loosely mounted upon said shaft and engaging with the detent to effect periodical disengagement, and a trip device adapted to act on said shells to effect the disengagement of said detent and ratchet.

7. In a corn-planter, a clutch for intermittently and continuously transmitting motion, composed of a shaft to be driven, a ratchet-wheel mounted upon said shaft, and adapted to receive rotary motion, a shell secured upon said shaft, a detent carried by the shell and normally engaging with the ratchet, another shell loosely mounted, and engaging with the detent to disengage it, and a trip device adapted to be set in and out of contact relation with said shells, whereby when in contact relation it will alternately permit of the engagement of the detent with the ratchet and disengage such detent from the ratchet, and when out of engagement it will permit the maintenance of said engagement, so that in one case intermittent and in the other continuous rotary motion is transmitted.

8. In a corn-planter, the clutch for transmitting intermittent and rotary motion, composed of a sleeve ratchet-wheel secured to the driven shaft, a shell connected to said shaft, a driving-wheel secured to said sleeve, and a shell loosely mounted on said sleeve, the fixed shell being larger than the loose shell and both shells having normally-unmatching openings, a detent carried by the connected shell, a spring to force it into engagement with the ratchet, and a lug on the loose shell to throw it out of engagement, and a pivoted trip-lever having a roller at one end and adapted to travel upon the larger shell and to spring into said openings to force them into line, a spring acting on said lever, and a device to lock the lever out of contact with the shells.

9. In a corn-planter, the combination with a dropper-shaft having a plate with pins, of a seed-tube, a pivoted valve therein working over a shelf, a valve-stem connected to said valve and having a projection intermittently lifted by said pins to open the valve, and another projection on the stem, and means to engage it to hold the stem and valve in open position and the stem out of reach of said pins, whereby hill-planting and drill-planting may be alternately done.

10. In a corn-planter, the combination with a seed-tube having one or more stud-shafts, of a disk for each of said stud-shafts having a hub, a removable sleeve mounted on each of said stud-shafts and within said hubs and longer than the hubs, caps covering the shaft-sleeves and hubs, and holding the sleeves against rotation, and a through-bolt to hold the caps.

11. In a corn-planter, the combination with a suitable frame or support having a slotted cup cast or otherwise secured thereto, a check-row lever or fork-arm pivotally mounted in said slotted cup, a helical spring secured to said lever or fork-arm at one end and at its other end made fast to a fixed part of the machine, and adapted to move said lever or fork-arm in the opposite direction from that in which it is moved by the check-row wire, substantially as shown and described.

12. In a corn-planter, the combination with a suitable frame or support having a slotted cup cast or otherwise secured thereto, a check-row lever or fork-arm extending through the slots in said cup, a bolt extending through said frame or support and into the cup and through the lever or fork-arm and acting as a pivot for said lever, a cap fitting upon the cup and adapted to be held thereon by means of said bolt, and a helical spring coiled about said bolt, one end of which engages with said lever or fork-arm and the other end of which is secured to a fixed part of the machine, said spring adapted to operate said lever in the opposite direction to that in which it is operated by the knots on the check-row wire, substantially as shown and described.

In testimony whereof I affix my signature in presence of two witnesses.

WILLIAM M. FRANK.

Witnesses:
W. M. McNAIR,
CHAS. L. SNIDER.